Patented Feb. 28, 1928.

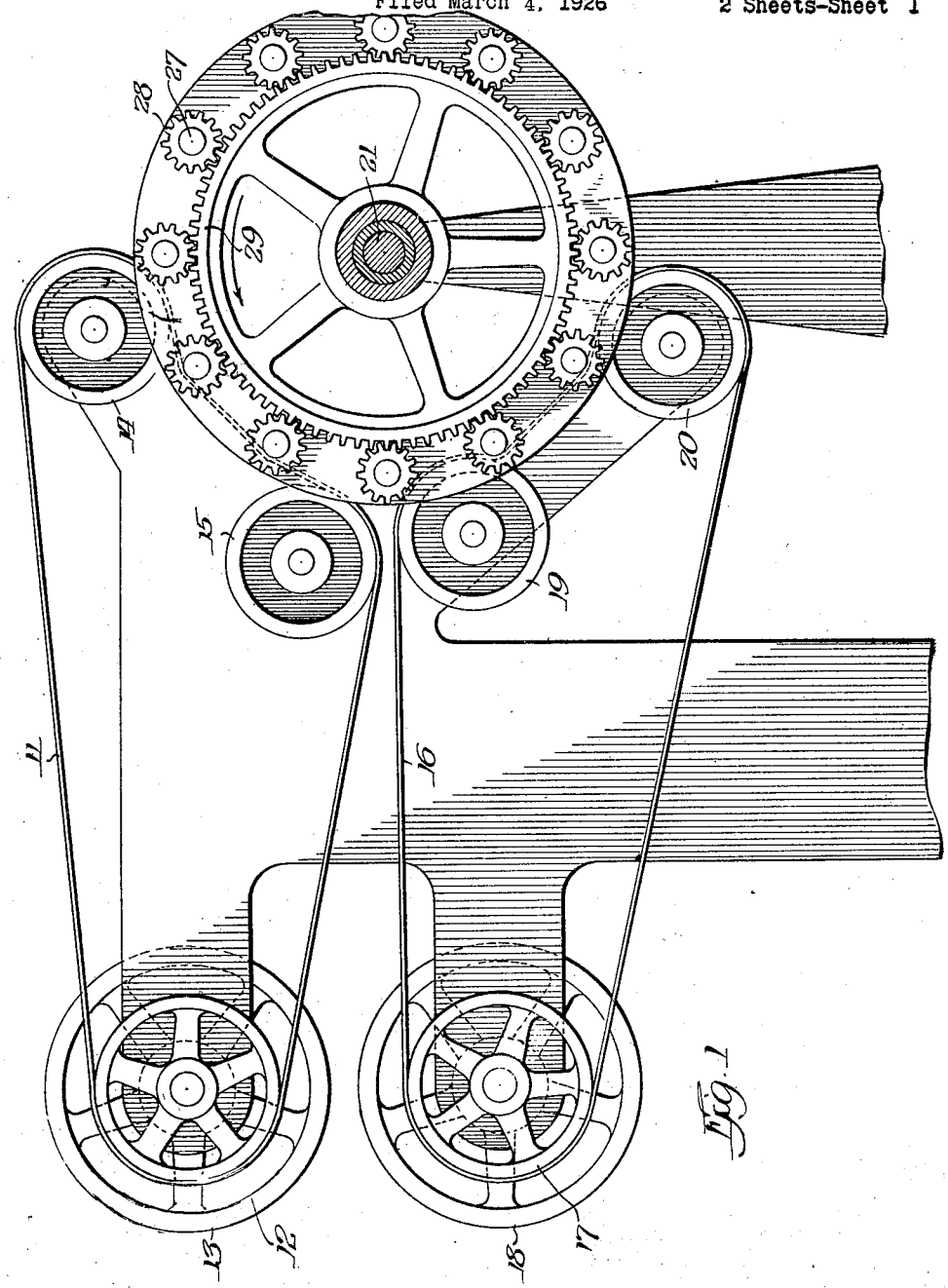

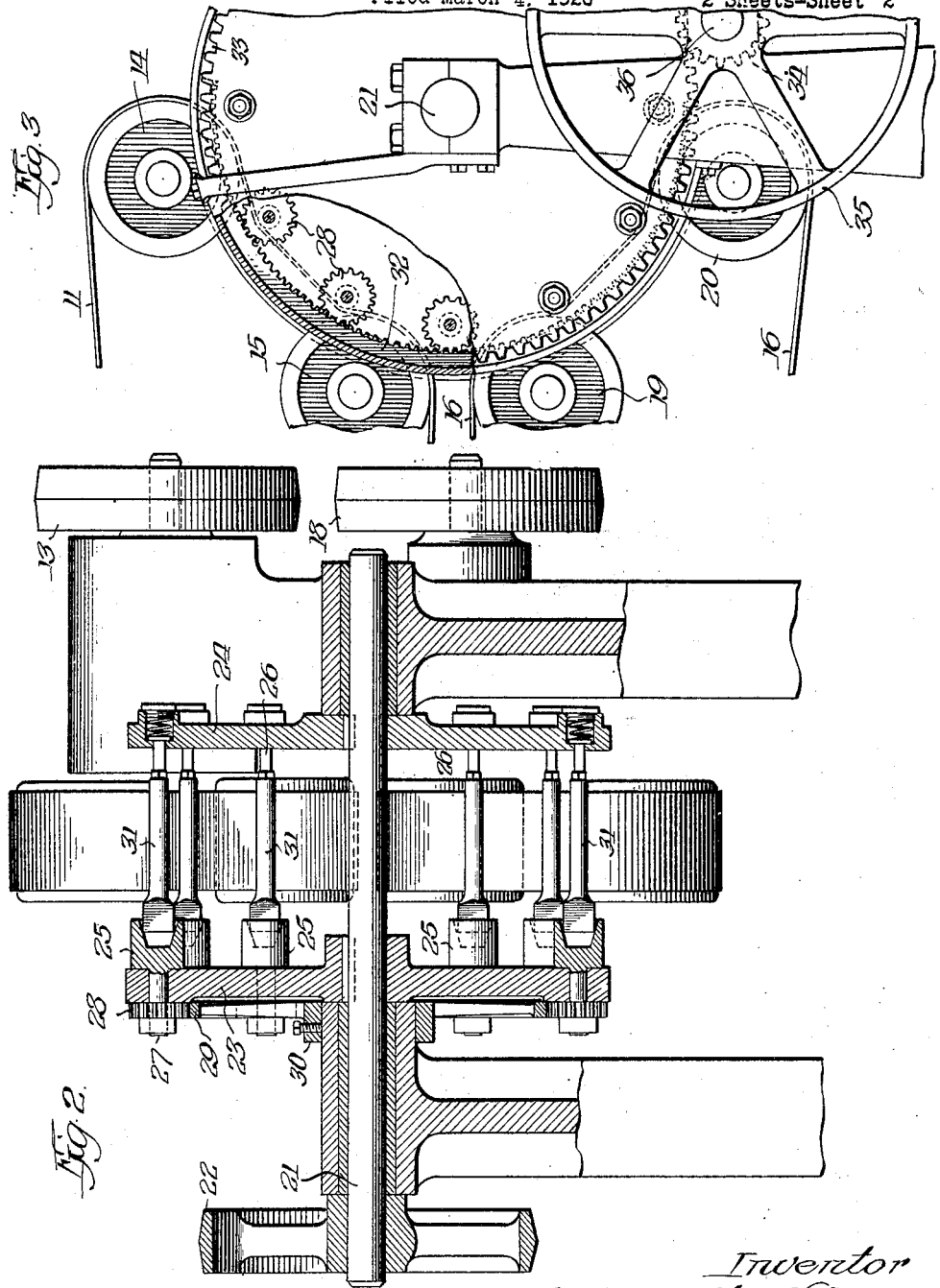

1,660,535

UNITED STATES PATENT OFFICE.

ANDREW S. VAN HALTEREN, OF EAST LANSING, MICHIGAN, ASSIGNOR, BY MESNE ASSIGNMENTS, TO STEEL WHEEL CORPORATION, OF LANSING, MICHIGAN, A CORPORATION OF MICHIGAN.

MEANS FOR FILLING SPOKES.

Application filed March 4, 1926. Serial No. 92,128.

My invention has to do with the application of any suitable filler composition to the surface of objects made from wood or other porous material in the preparation of such objects to receive a coat of paint or other finish.

Heretofore it has been customary to apply the filler by hand with a brush or other medium and then to rub the same in and remove the surplus by hand with a cloth or other fibrous friction body. When the composition is to be applied to all sides of a solid body, such as wheel spokes, chair rungs, baseball bats, etc., it is a tedious matter to so apply the filler by hand and to insure uniformity of distribution, penetration and degree of removal.

According to my invention, application, penetration and removal of surplus composition is more efficiently and uniformly secured by passing the objects to be filled successively into contact with moving friction belts for advantageously rotating the objects while being treated.

To facilitate a clear understanding of the improved method and one form of mechanism for practicing the same, I have herein illustrated the invention as applied to the treatment of wheel spokes.

In the drawing:

Fig. 1 represents such a machine in side elevation;

Fig. 2 is an end elevation of Fig. 1; and

Fig. 3 is a fragmentary view illustrating a modification in the drawing.

In the drawing, a filler-applying belt 11 is driven from the pulley 12 by means of the drive pulley 13, which belt passes over idlers 14 and 15. A wiping belt 16 is driven by the pulley 17 by means of the drive pulley 18 which belt passes over idler pulleys 19 and 20.

These belts are preferably of closely woven fabric, the filler-applying belt being adapted for impregnation with a filler composition which may be applied to the surface thereof by hand or any suitable feeding device. The wiping belt 16 is also advantageously made of closely woven fabric adapted to supplement the belt 11 in causing penetration of the composition into the pores of the wood and to remove therefrom any surplus material.

Upon the shaft 21, driven by the pulley 22, is mounted a cage-like frame or reel comprising side frame members 23 and 24, the former provided with centering head chucks 25 and the latter with centering spindles 26. Upon the axle 27 of each of the head chucks 25 is mounted a pinion 28. These head chucks and tail spindles are mounted in opposed relation to each other and in an annular series about the shaft 21. A ring gear 29 is carried by the boss 30 fixed upon the machine frame and serves as a toothed rack, with which all of the pinions 28 mesh and by which they are rotated upon their respective axes as they revolve about the shaft 21. The objects to be treated, spokes 31, for example, have one end seated in the head chucks 25 and the other end releasably held by the spring-pressed tail spindles 26 and therefore occupy a position transverse to their path of revolution about the reel axis and also transverse to the path of the moving belts 11 and 16, the plane of revolution of the spokes being parallel to and included within the planes of travel of the belts.

The spokes 31 are successively brought into contact with the belt 11 by the revolution of the reel and as they are being rotated by the pinions 28, the spoke surface is subjected to a rubbing action by the belt whereby the filler composition carried by the belt surface is applied to and caused to penetrate the porous surface of the spoke. As the spokes progress, after leaving contact with the filler-applying belt 11, they come into contact with the wiping belt 16 whereby the filler composition is additionally rubbed into the surface and the surplus removed, the spokes themselves being released from the chucks and replaced by others before the chucks next reach the filler-applying belt.

In that form of construction previously described the rotation of the pinions and the chucks is constant, being effected by the engagement of the pinions with the continuous ring gear 29. In that form of construction shown in Fig. 3 the pinions are driven periodically by engagement with an arcuate rack 32, here shown as toothed on its interior rather than the exterior. By this arrangement the chucks and spokes are rotated only during the engagement of the latter with the belts and the chucks are stationary while the spokes are being removed and replaced.

Obviously the belts and reel may be driven directly or by gear trains and it will also be understood that the path of travel of the applying and wiping belts may be counter to or in the same direction as the surface movement of the spokes at the point of contact; relative movement between the belts and spokes to provide rubbing friction being attained by differences in surface speed in the same direction or by movement in a counter direction. For example, in Fig. 3 the reel is driven by interior gear teeth 33 from a pinion 34 on the hub of a drive wheel 35 mounted on the shaft 36. Here the objects to be treated rotate in a direction counter to that of Figs. 1 and 2.

I claim:

1. A machine for applying filler composition to the outer surface of objects, comprising a filler-applying belt, a wiping belt, means for driving said belts, and means for bringing the objects successively into frictional surface contact with the two belts, said means comprising a revolving reel carrying a series of holding chucks, the orbit of the chucks being substantially tangent to the paths of the applying and wiping belts.

2. A machine for applying filler composition to the outer surface of objects, comprising a filler-applying belt, a wiping belt, means for driving said belts and means for bringing the objects successively into rotating friction surface contact with the two belts, said means comprising a revolving reel carrying a series or rotating chucks, the orbit of the revolving and rotating chucks being substantially tangent to the paths of the applying and wiping belts.

3. A machine for applying filler composition to the outer surface of substantially cylindrical objects, comprising a filler-applying belt, a wiping belt, means for driving said belts and means for bringing the objects successively into rotating friction surface contact with the two belts, said means comprising a revolving reel, an annular series of chunks rotatably mounted in the reel, each of the chucks carrying a pinion, a curved rack forming a toothed path for the pinions, the orbit of the revolving and rotating chucks being substantially tangent to the paths of the applying and wiping belts.

4. A machine for applying a coating composition to the outer surface of objects, comprising belts for successively applying the coating composition to said objects, and rubbing said composition in and wiping the excess off, and a holding frame for bringing the objects into contact with the belts.

5. A machine for applying coating composition to the outer surface of objects, comprising belts for applying the coating composition, and for rubbing said composition in and wiping the excess off, with which belts the object is successively brought into contact, a holding frame for said objects, said frame containing rotatable chucks containing the said objects, and means for causing the objects to be brought into successive contact with the belts.

In testimony whereof I have hereunto signed my name.

ANDREW S. VAN HALTEREN.